United States Patent
Spetz

[15] 3,691,935
[45] Sept. 19, 1972

[54] BROILER

[72] Inventor: Frank F. Spetz, 108 Skyline Drive, Jensen Beach, Fla. 33457

[22] Filed: Nov. 8, 1971

[21] Appl. No.: 196,651

Related U.S. Application Data

[63] Continuation-in-part of Ser. No. 41,227, May 28, 1970, abandoned.

[52] U.S. Cl. .................99/327, 99/339, 99/349, 99/391, 99/393, 99/400, 99/402, 99/427, 99/443 C

[51] Int. Cl. ................................A47j 27/62

[58] Field of Search........99/349, 327, 400, 402, 339, 99/368, 389, 390, 391, 392, 393, 423, 427, 426, 446, 443 C, 450

[56] References Cited

UNITED STATES PATENTS

| | | | |
|---|---|---|---|
| 1,656,181 | 1/1928 | Elbert | 99/390 X |
| 2,397,040 | 3/1946 | Pallich | 99/392 |
| 2,494,812 | 1/1950 | Holifield | 99/402 X |
| 2,556,808 | 6/1951 | Harris | 99/443 X |
| 2,607,286 | 8/1952 | Krissel | 99/402 UX |
| 2,787,947 | 4/1957 | Schatten et al. | 99/402 X |
| 2,923,229 | 2/1960 | Halford | 99/390 X |
| 3,495,524 | 2/1970 | Miles | 99/400 X |
| 3,525,300 | 8/1970 | Genetti | 99/427 |
| 3,543,671 | 12/1970 | Pendzimas | 99/386 |

FOREIGN PATENTS OR APPLICATIONS

| | | | |
|---|---|---|---|
| 1,363,267 | 5/1964 | France | 99/443 |

*Primary Examiner*—Billy J. Wilhite
*Attorney*—Kenneth E. Merklen

[57] ABSTRACT

A food broiler in the form of a home appliance and a commercial appliance employs a food gril-holder suspendable on a retaining means in a broiling chamber formed by three cooking elements for broiling food. The broiler includes a food broiling channel or chamber formed by the broiling elements, a food grill-holder and a means for suspending the grill-holder in the broiling chamber. Broiling or cooking is controlled by temperature or time of exposure or both. Switch means is provided for electrically coupling the heating elements selectively for varying the heat intensity in the cooking chamber, as desired.

13 Claims, 9 Drawing Figures

PATENTED SEP 19 1972 3,691,935

FRANK F. SPETZ
INVENTOR

BY
*Kenneth E. Merklen*
ATTORNEY

FRANK F. SPETZ
INVENTOR

ATTORNEY

FRANK F. SPETZ
INVENTOR

BROILER

This application is a continuation-in-part of application Ser. No. 41,227, filed May 28, 1970, now abandoned.

The present invention relates to appliances for preparing food for consumption. More particularly the present invention relates to home and/or commercial appliances used in preparing meat for consumption by cooking such meat so as to render out the fats and/or fatty tissue from the meat rapidly and substantially completely, without over cooking the meat and thus preserve its palatability.

The health conditions of many people are such as to require minimal consumption of animal and/or vegetable fats in their diet. Here-to-fore it was difficult to prepare meats, in particular, without fat and still have the meat remain palatable unless substantially all the fat and fatty tissues were removed from the meat prior to cooking.

The present invention may be broadly referred to as a "Broiler." However, an embodiment of the present invention provides structure for cooking, for example broiling, the meat while contained in an enclosed grill or grill-holder which suspends the meat portion within a heat or cooking chamber so that the meat is broiled on all sides at the same time. Means are provided to control the temperature of the heat source and the time the meat is to be cooked.

Provision is made to hold the meat, whether it be steak, hamburger, chops, chicken parts or other, in a vertical position in a grill-holder or food retainer so that the rendered fats may be separated from the meat quickly and without hanging to the cooked (broiled) food.

In its preferred form the grill-broiler is suspended between two heating elements, which are electric heat elements, backed by refectors. The grill-holder or grill-broiler is perforated so that the food gets the benefit of radiant heat cooking direct from the heating element and conduction heat cooking by the griddle or grill of the grill-holder. Since the food, for example meat, is fully exposed to a cooking heat within a broiler-chamber and therefore cooked on both sides at the same time, the meat tends to cook more evenly and uniform through-out and the cooking time is reduced.

Since the cooking heat is applied to both sides of the meat portion at the same time, the inside of the meat is more evenly cooked and the fats and fatty tissues are more completely rendered out of the meats.

This avoids the necessary of cooking more on one side than on the other, which here-to-fore was an accepted practice in broiling steak, for example.

The combination of rapid cooking and completed rendering of the fats and fatty tissue from a meat portion provides a piece of prepared meat which is more tender and tasty than the same portion would have been had it been cooked on one side and then turned over and cooked on the other side. As the fats and fatty tissues are rendered from the meat tissue the fats flow from the essentially evenly heated meat and the rendered fats remain in liquid form and flow into a drip pan. By using this type of broiling, food is really cooked dry (but not dehydrated) in the sense that fats are fully rendered from the food.

Although the preferred embodiment employs electric heating elements the cooking heat may be flame or any other heating source capable of cooking meat or other foods. In the illustrated form three heating elements, one on each side of the grill-holder, and one over the grill-holder are electric heating element which are connected to normal house current. A heat control device may include a theromostatic control so that the desired cooking or broiling temperature condition may be maintained during the cooking process. In addition a timing element combined with an on/off switch may also be used. In one form a selector switch is provided which affords selective use of the heating elements in various combinations, as desired.

It may be preferred to provide for pre-heating the broiler and then set the timer when the broiler is heated to the desired temperature and/or condition for cooking or broiling. The meat portion, secured in the grill-holder, may then be suspended in the broiling chamber by suspending the grill-holder in the broiling chamber on the suspension-rod. The timer may then be set to override the on position of the on/off switch and turn off the appliance. In accordance with such use all heating elements may be used for rapid, intense pre-heating in one position, normal cooking in another position and warming or toasting in a third position.

When one considers the illustrated embodiments of the present invention it will be apparant that a large variety of meats and/or cuts of meat, fowl, fish, and many forms of vegetable may be cooked in the present broiler. The grill-holder, although illustrated as round, and apparently very well suited for the broiling of hamburgers, or chopped meat, may be in any shape. Preferably flat cuts of meat such as steak, chops, fowl parts and hamburger and/or meat patties as well frankfurters are those types of meats invisioned as being cooked in the novel broiler. In addition some forms of vegetables may be cooked in this broiler since cooking is accomplished from both sides at the same time and both cooking temperature and cooking time may be precisely controlled.

It is a principal object of the present invention to provide a broiler for preparing food which cooks the food on both sides at the same time, while retaining the food in a grill-holder suspended within the cooking chamber thereby rendering the food substantially fat-free while retaining palatability.

Another object is to provide a broiler for preparing meat in which a grill-holder is used to hold the meat and a suspension means is used to suspend the grill-holder in the cooking heat of the broiling chamber.

Another object is to provide an appliance type meat broiler for broiling meat, such as hamburger and/or steak on both sides at the same time and to render such meat substantially fat-free.

Another object is to provide a grill-holder which serves as a food patty maker or patty-press and also serves to support such food patty in the cooking chamber of the broiler applicance provided.

These and other objects will become apparant upon reading the following description of the invention with reference to the accompanying drawings in which.

Figure 1:
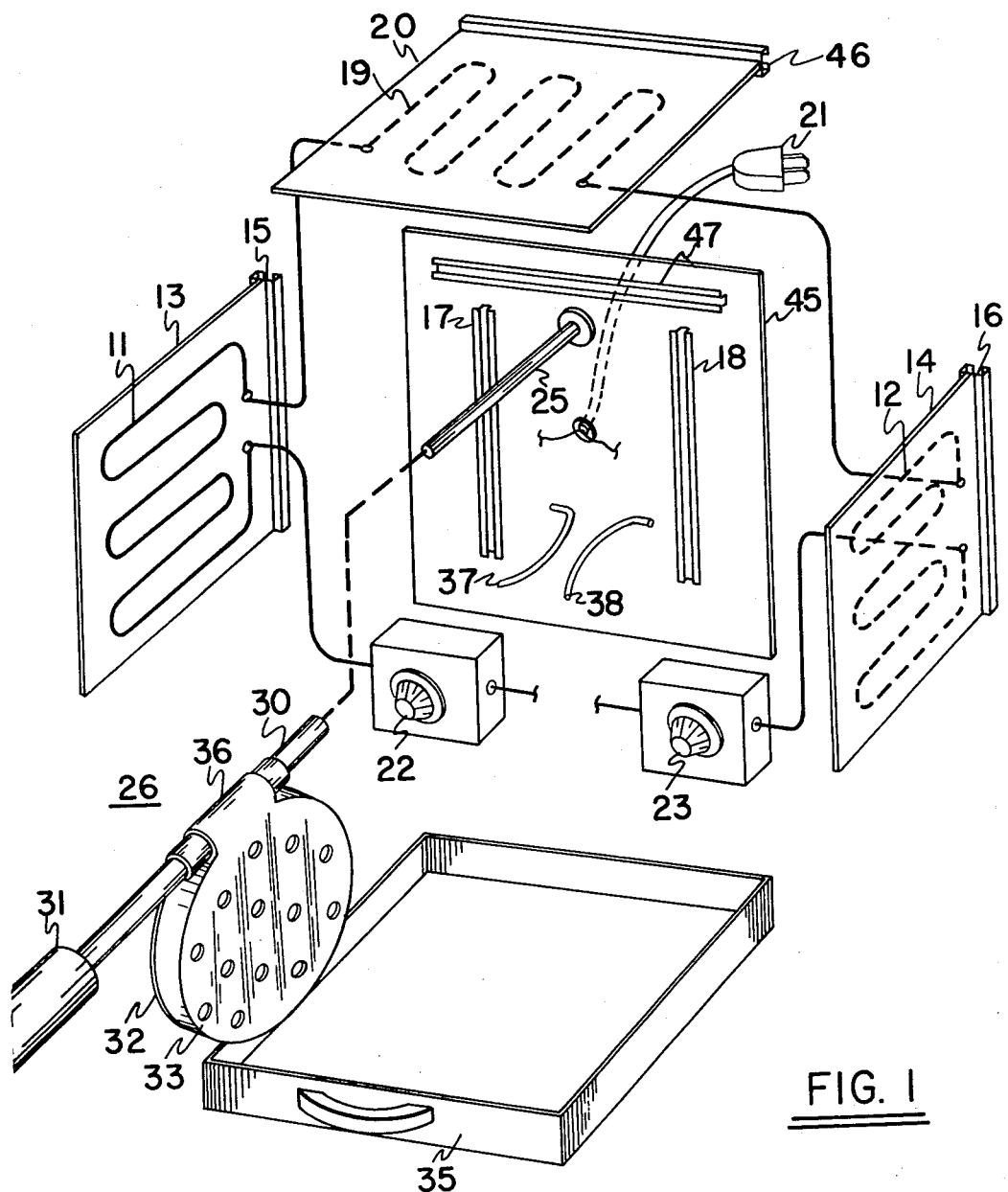
FIG. 1 is an exploded simplified diagram of the basic components of the novel broiler.
Figure 2:
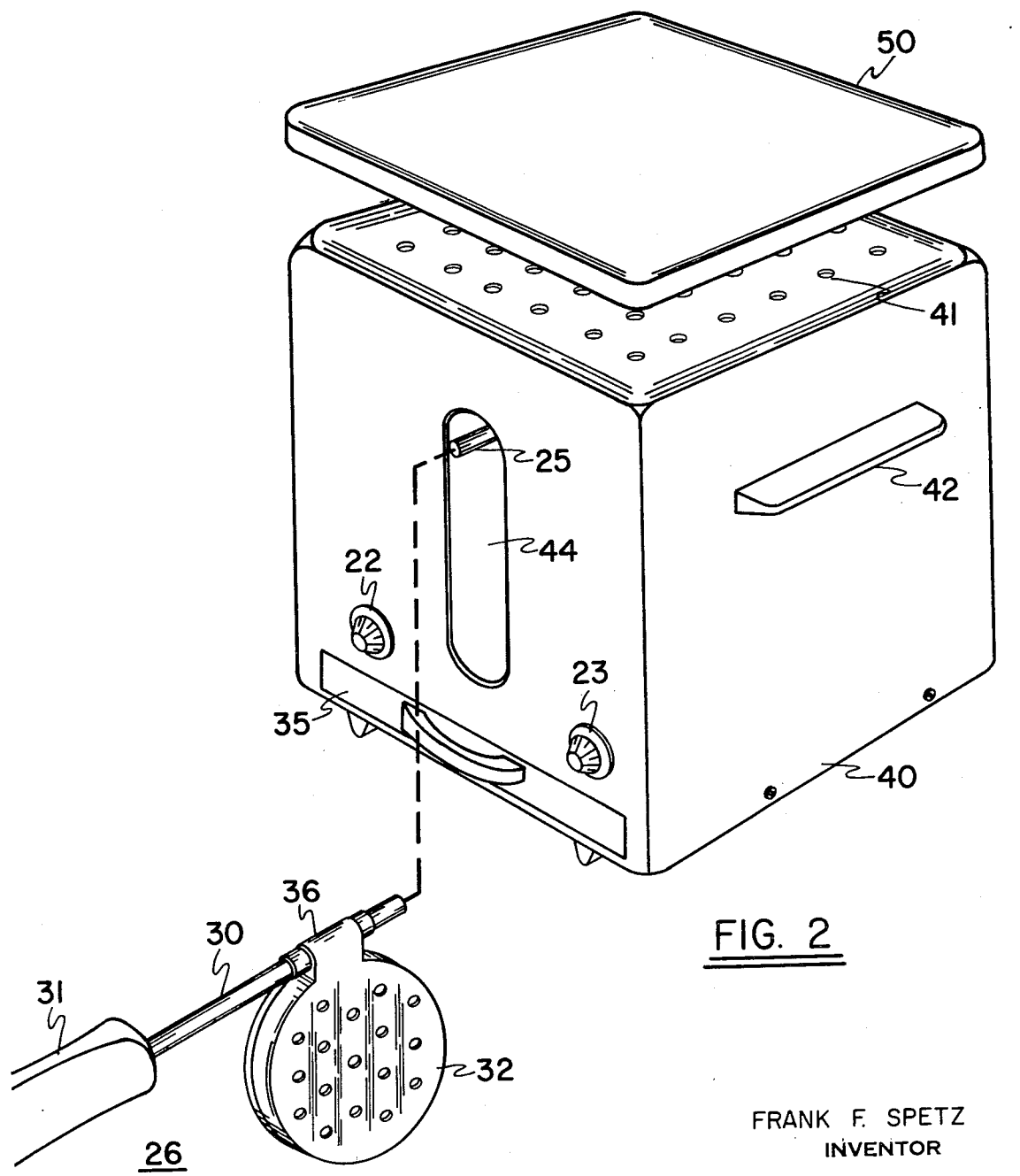
FIG. 2 is a pictorial view of one form of appliance which may be employed in home use.

Referring to FIG. 1 in more detail, the basic components of the present invention are represented in exploded form. The exterior cover, which maybe a housing has been eliminated from FIG. 1 although one form of cover or housing is shown in FIG. 2. The electric heating elements 11, 12 and 19 are supported on reflector plates 13, 14 and 20 respectively. The reflector plates 11 and 12 are positioned in parallel relation by the slides 15 and 16 fitting over or into the tracks 17 and 18 on the back support plate 45. Reflector plate 20 has slide 46 on its end and slide 46 fits into track 47 suspending heating element 19 across the top of the heating chamber.

Figure 7:
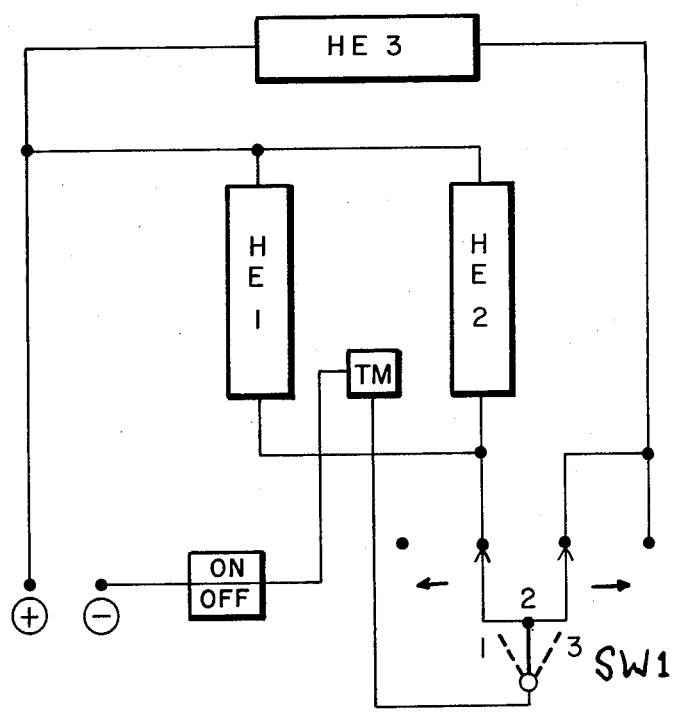
FIG. 7 represents in block form the switch selection of the heat elements.

It will be apparent that other means may be used to support the heating elements 11, 12 and 19 as it may be desired to employ relatively heavy material heating elements which may need no additional support. The heating elements are coupled to the electric source, represented by the plug-lead 21, in series circuit arrangement with a temperature control 22 and an on-off timer 23 connected between the heating elements, for convenience and simplification of the drawings, The heating elements may be electrically coupled in parallel circuit arrangement and the temperature control 22 and on-off timer 23 may be located in another part of the circuit, if desired. FIG. 7 represents in simplified form a parallel circuit arrangement of the heating elements HE1, HE2 and HE3 and a three position, two prong switch which may, in position 1 connect or couple heating elements HE1 and HE2 in the circuit, in position 2 (as illustrated) connect or couple all three heating elements in the circuit and, in position 3 connect or couple only heating element He 3 in the circuit. The block TM represents a thermostatic control. A timer and on/off switch may also be included as represented in FIGS. 1 and 2.

The reflector plates 13 and 14 are positioned so as to effectively "bracket" the suspension element or rod 25, which rod is coupled to the back plate 45. With the heating elements 11 and 12 inside the reflector plates 13 and 14 a cooking or broiling chamber is formed through which the rod 25 extends. The grill-holder is coupled to the suspension element or rod 25 by a coupling means. The grill-holder 26 is a multi-purpose component. Heating element 19 on reflector plate 20 serves to provide a more uniform heat in chamber and further heat the warming pan shown in FIG. 2 at 50.

The grill-holder includes a coupling for attaining a suspended relation from the suspension element or rod 25. One type of coupling is represented as a hollow or tubular member 30 extending from a handle 31. The tubular member 30 fits slidably over the suspension rod 25 and effectively positions the meat-retaining grill 32 substantially within the broiling chamber.

The food or meat retaining grill or grill-holder 32 is represented as a two-piece component, hinged at 36 around the tubular member 30 so as to be capable of opening at the bottom in "clam-shell" fashion. The grill-holder 32 here shown includes a dish-like part and a cover-like part, both being made of a corrigated form of good heat conducting metal. The large surfaces of the grill-holder are perforated and preferable the rim 33 includes one or more holes (not shown) at the lower part of the rim. The holes or perforations in the side or large surfaces serve to permit radient heat to contact the meat. The metal surface of the grill-holder serves as a cooking grill, heated by the heating elements 11 and 12. The size of the holes or open portions in the sides of the grill-holder may vary, as desired. For broiling, per se the holes or open portions in the grill-holder sides may be made large with respect to the area of the side or surface. Thus the meat, during the cooking process is cooked with radient cooking heat and with grill or griddle type cooking heat. The holes not shown on the rim 33 of the grill-holder serve to provide relief of rendered fat through the bottom of the grill-holder. A drip-pan 35 is provided to catch and retain the rendered fats relieved from the grill-holder during cooking.

It will be appreciated that because of its "over head" position the heating element 19 adds only slightly to radient cooking but because of its over head position, cooking heat is directed downward and is suspended in the heating chamber rather than permitting a free flow of heat upward. This interference with the "free flow" of cooking heat provides a more uniform cooking heat in the cooking chamber, especially at lower cooking temperatures. At higher cooking temperatures the cooking heat is more uniform and intense throughout the entire cooking chamber and cooking is accomplished at a more rapid and uniform rate.

When the grill-holder 26, is suspended in cooking or broiling position on the suspension rod 25, a pair of clips or cooperating fingers 37 and 38 hold the grill-holder closed.

The grill-holder 26, when removed from the suspension rod 25 may serve as a hamburger patty press. Ground meat or hamburger meat may be pressed into the open dish-like part of the grill-holder, the ground meat portion forming a patty of meat or hamburger in the contour of the dish. The top part of the grill-holder may be closed serving as a press. This effectively provides a hamburger patty press which may serve as a grill-holder usable in the broiler here provided. Obviously the grill-holder may take another shape, such as rectangular, for example.

FIG. 2 illustrates pictorially a single broiler unit appliance in which the internal components represented in FIG. 1 are enclosed in a cover 40. The cover may be in cover 40 and may include a ventilated cover 41 and decorative handles on each side (one handle shown at 42). A warming pan 50 may be made to fit over the ventilated cover 41.

It will be appreciated that the cover top 41 may be made without the ventilation holes and that ventilation holes may be placed at or near the top of the side and/or back panels of the cover 40. Such arrangement may provide an internal heat-well between cover 41 and pan 50. This will heat up the pan 50 when the heating elements are on there by providing a heated surface or warming grill for warming, crisping or toasting buns and/or rolls and for heating and/or keeping warm other foods such as french fried potatoes, for example. By selectively positioning the three position switch to its position 3 the warming pan 50 may be made warm, rather than hot so as to delicately warm foods slowly.

The cover or housing 40 includes an opening 44 through which the grill-holder 26 may be inserted into the broiler, the tubular member 30 being slid over the retaining or suspension rod 25 for positioning the meat-retaining grill 32 in the broiler chamber sufficiently far so as to be held together by the grill-holder clamps 37 and 38.

Figure 3:
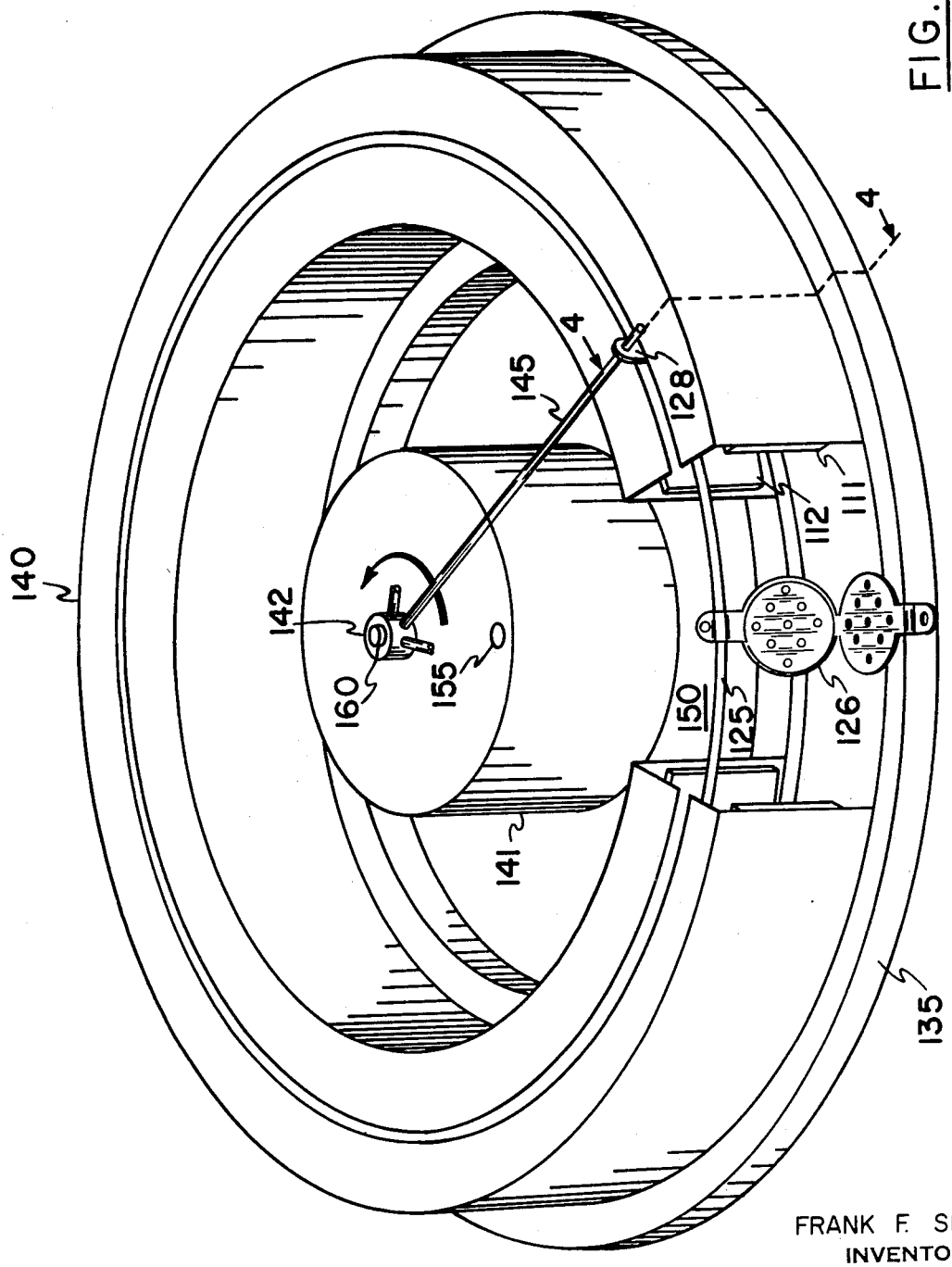
FIG. 3 is a diagrammatic view of one form of commercial appliance employing the principles of the present invention.
Figure 4:
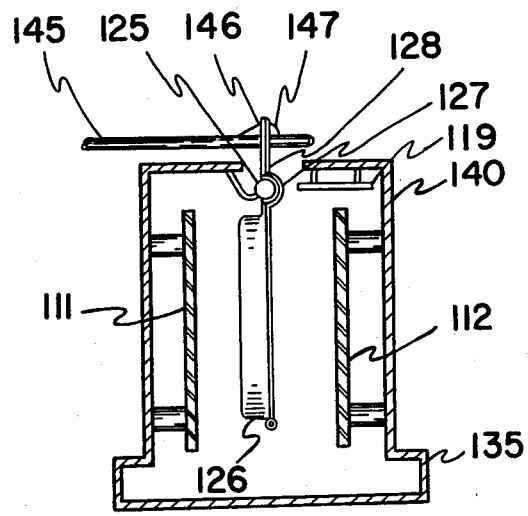
FIG. 4 is a sectional view of the circular broiler through line 4—4 of FIG. 3.

FIG. 3 illustrates another embodiment of the present invention, in which the broiler or broiling chamber is circular. Where the embodiment of FIGS. 1 and 2 show a single broiler or broiling chamber it is appreciated that this form of embodiment may be made in a multi-chamber broiler appliance. The embodiment of FIG. 3 shows the suspension rod 125 as a ring on which the grill-holder 126 is suspended by a fixed C clamp or hanger, more clearly seen in FIG. 4. The grill-holder 126 includes a hinge 136 at one end and a hanger 127 at the top end, which fits over the suspension ring 125. The housing 140 is open or split at the top and permits the lip 128 of the hanger 127 to extend beyond or above the housing 140. As seen in FIG. 4, the housing 140 supports the suspension ring 125 and the heating elements represented at 111, 112 and 119. Internal reflector plates may be used between the inside of housing 140 and each heating element, if desired. A drip-pan or trough 135 serves to catch the rendered fats as the meats are cooked in the circular broiler. Electrical connections in FIG. 3 have been eliminated for simplicity of description. The block diagram of FIG. 7 may represent the electrical connections for the heating elements.

As seen in FIG. 3 a motor 141 is provided which rotates a capstan member 142. The capstan 142 may be coupled to the motor 141 by gearing so as to reduce the speed of rotation of the capstan to the desired speed of rotation. A speed control represented by adjustable knob 160 maybe used if desired. The capstan 142 has extending therefrom a plurality of arms, one of which, arm 145, is shown. The other end of arm 145 extends through the lip 128 of the grill-holder and holds the two parts of the grill-holder together as by the clamping arrangement seen clearly in FIG. 6 (stop tooth 146 and pivot tooth 147). This coupling also serves to drive the grill-holder 126 around through the circular broiler chamber, as an extension of the capstan 142.

The arms 145, one of which illustrated, others of which are indicated in part, may be fixed to the capstan 142 or the capstan 142 may have a plurality of holes or protuberances into or onto which the arm 145 may be coupled, In another arrangement the capstan may be larger in diameter than represented and many more arms 145 may be coupled to the capstan if desired.

Figure 6:
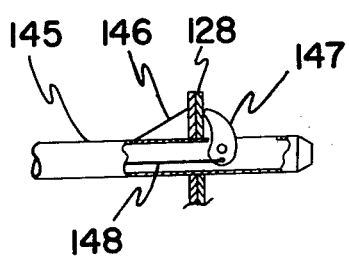
FIG. 6 is a cut-away of one form of clamp at the end of the capstan arm for holding the grill-holder closed during the circular broiling run through the broiling chamber.
Figure 6A:
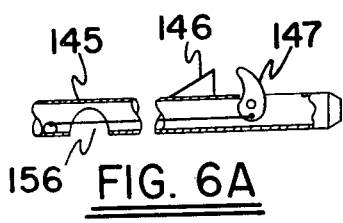
FIGS. 6A and 6B illustrate the trip-release mechanism of FIG. 6.
Figure 6B:
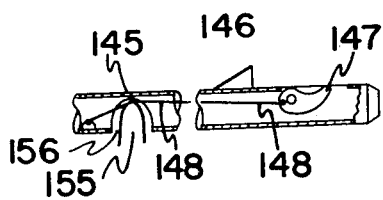

The circular broiler of FIG. 3 may include a temperature control for controlling the cooking temperature of the broiler unit. In addition, a speed control represented by knob 160, for controlling the speed of rotation and therefore the time of cooking, or broiling maybe included so that uniformity of cooking or broiling is assured. A clamp release or trip finger 155 may be positioned in the arcuate track of the arm 145 so as to trip a line 148 and cause pivot tooth 147 to recess in the arm 145 and release one or both of the extending lips 128 of the grill-holder 126 after the grill-holder emerges from the broiling channel on the mono-rail arrangement. Such clamp release may be in the form of a finger 155 positioned on the top of the motor cover which trips a line 148 through opening 156 causing tooth 147 to recess into arm 145, for example, The pivot tooth 147 may be recessed by the trip finger lifting the trip line 148 as the arm 145 passes over the trip finger 155. A slot 156 is provided in arm 145 exposing the trip line inside arm 145 and providing space for finger 155 to lift and functionally shorten the trip line 148 as the arm 145 passes over the trip finger 155. The grill-holder 126 is held together by the pivot tooth 147 and the stop tooth 146. Tooth 147 is spring biased to an upright position as shown in FIGS. 6 and 6A by a spring (not shown) in a conventional manner. The grill-holder 126 may be opened about hinge 136 and deposits the broiled food at the open section 150 of the circular broiler. The grill-holder maybe removed from the circular suspension rod 125 at section 150. In addition, the grill-holder 126 would be suspended onto the circular suspension rod 125 at this open area and also be coupled to the end of arm 145 at this open area 150.

The tooth 146 and its cooperating tooth 147 compare with the cooperating fingers 37 and 38 functionally since each pair of cooperating members function to hold a grill-holder closed in the broiler chamber.

As seen clearly in FIG. 4, one arrangement of the hanger 127 includes a fixed C hanger on the one half of the grill-holder 126. The other half contours part of the fixed C hanger and is free to open when released by the pivot tooth 147 of the clamp 146–147 recessing into the arm 146.

Figure 5:
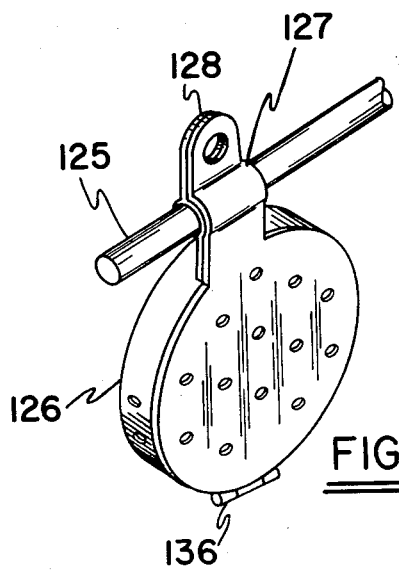
FIG. 5 is a pictorial view of the ring-suspension grill-holder.

Referring to the grill-holder 26 of FIGS. 1 and 2 and 126 of FIGS. 3, 4 and 5 it will be seen that the grill-holder is a two piece, hinged food holder. This best seen in FIG. 3. As previously mentioned this grill-holder may be used to form ground meat patties, such as hamburger or sausage patties, by placing a quantity of ground or chopped meat in the open grill-holder and pressing the holder closed so as to press the ground meat into a patty form. The grill-holder may then serve to convey the newly made patty through the broiler unit as in FIG. 3 or to suspend the newly made patty in the broiler as in FIG. 2.

It is apparent that this form of fat-free broiling need not be limited to cooking meat. Some forms of vegetable may also be cooked in my fat-free broiler. However, cooking time and cooking temperature may be more critical with vegetables than with meat.

It is further apparent that another form of broiler may include only the spaced, parallel heating elements such as heating elements 11 and 12, for example, forming the broiling chamber. The over head positioned heating element 19 and its reflector plate 20 may be eliminated if desired.

Thus I have presented two illustrated embodiments of my invention without limiting my invention to such embodiments. Other arrangements may be made embracing the principles disclosed herein, as will be familiar to those skilled in the art, without departing from the spirit of the invention.

What is claimed is:

1. A food broiler having a broiling chamber adapted to broil food on both sides at the same time, said broiler including:
   first, second and third heating elements spaced to provide a chamber between them for forming a broiling chamber,
   means coupled between each of said heating elements and an energy supply for selectively coupling each of said elements to an energy supply for providing energy to heat said elements,
   means for controlling the energy provided to said heating elements for controlling the temperature within said broiling chamber,
   rod means extending horizontally along said broiling chamber, to support a food retainer within said broiling chamber,
   a grill-holder adapted to be supported by said rod means for retaining food for suspending food in said broiling chamber and
   a pair of cooperating members adapted to receive separable parts of said grill-holder for holding said grill-holder closed.

2. A food broiler as in claim 1 and in which said first, second and third spaced heating elements combine to form a circular broiling chamber and
   said rod means is circular.

3. A food broiler as in claim 1 and further providing means for controlling the time the grill-holder is in said broiling chamber.

4. A food broiler as in claim 3 and in which said first and second spaced heating elements form a circular broiling chamber and
   said time control means includes
   a capstan, drive means coupled to said capstan for rotating said capstan
   arm means adapted for coupling to said capstan and extending at least to said rod means for coupling to said grill-holder when suspended on said rod means for driving said grill-holder through said circular broiling chamber.

5. A food broiler as in claim 4 and further providing means for controlling the speed of said drive means for controlling the speed of rotation of said capstan for controlling the time said grill-holder is in said circular broiling chamber.

6. A food broiler having a broiling chamber adapted to broil food on both sides at the same time, said broiler including;
   first and second heating elements spaced to provide a vertical chamber between them,
   a third heating element spaced above and substantially between said first and second heating elements,
   said first and second and third heating elements forming a three sided broiling chamber,
   means coupled to each of said heating elements for selectively coupling each of said elements to an energy supply for providing energy to heat said elements as desired,
   means for controlling the energy provided to said heating elements for controlling the temperature within said broiling chamber,
   rod means extending horizontally along said broiling chamber for supporting a food retainer within said broiling chamber,
   food retainer means adapted to be supported by said rod means for suspending food in said broiling chamber, said food retainer means including a first part and a second part hinged at one end and openable about the axis of said hinge and;
   a pair of cooperating members adapted to receive said food retainer for holding said first part and said second part in closed position.

7. A food broiler as in claim 6 and in which said means for selectively coupling includes a multi-position switch for coupling energy to said first, second and third heating elements in one position,
   for coupling energy to said first and second heating elements only, in a second position and
   for coupling energy to said third heating element only, in a third position.

8. A food broiler having a broiling chamber adapted to broil food suspended in such broiling chamber on both sides at the same time, said broiler including;
   first and second heating elements spaced to provide a chamber between them,
   a third heating element spaced from said first and second heating elements and above said elements for forming a broiling chamber,
   rod means extending through said broiling chamber adapted to receive a food retaining device and to suspend such food retaining device in said broiling chamber for broiling food therein, and
   a grill-holder adapted to retain food and including means for coupling said grill-holder to said rod means for suspending said grill-holder within said broiling chamber.

9. A food broiler as in claim 8 and further including;
   switch means coupled positively to an energy supply and selectively couplable to said first, second and third elements for supplying energy to said first and second and third heating elements in one position,
   for supplying energy to said first and second heating elements only, in a second position and
   for supplying energy to said third heating element only, in a third position.

10. A food broiler as in claim 8 and in which said first, second and third heating elements form a circular broiling chamber and
    said rod means is circular and extends horizontally through said circular broiling chamber and said means for coupling said grill-holder to said rod means is a C hanger frictionally held to said rod means.

11. A food broiler as in claim 10 and further including
    means for advancing said grill-holder along said rod means and through said circular broiling chamber.

12. A food broiler as in claim 11 and in which said means for advancing includes,
    drive means,
    arm means for coupling said drive means to said grill-holder and variable speed control means for controlling the speed of said drive means for controlling the speed of advance of said grill-holder along said rod means for controlling the time said grill-holder is in said circular broiling chamber.

13. A food broiler as in claim 8 and in which said grill-holder includes;
a first dish-like part and
a cover part coupled to said first dish-like part adapted to form an enclosure for holding food therein,
said first dish-like part and said cover part including openings therein for permitting radiant heat to directly contact the food therein and for permitting escape of fats and fluids from the enclosure formed by said first dish-like part and said cover part,
and said broiler further includes first and second cooperating fingers for receiving said grill-holder and holding said dish-like part and said cover closed.

* * * * *